(12) United States Patent
Yu

(10) Patent No.: US 10,825,023 B2
(45) Date of Patent: Nov. 3, 2020

(54) VERIFICATION METHOD AND APPARATUS FOR USER SIGNING FAST PAYMENT WITH BANK CARD

(71) Applicant: ALIBABA GROUP HOLDING LIMITED, Grand Cayman (KY)

(72) Inventor: Yan Yu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/845,286

(22) Filed: Apr. 10, 2020

(65) Prior Publication Data

US 2020/0242609 A1 Jul. 30, 2020

Related U.S. Application Data

(63) Continuation of application No. PCT/CN2020/071161, filed on Jan. 9, 2020.

(30) Foreign Application Priority Data

Apr. 10, 2019 (CN) .......................... 2019 1 0283959

(51) Int. Cl.
*G06Q 40/00* (2012.01)
*G06Q 20/40* (2012.01)
*G06Q 20/32* (2012.01)

(52) U.S. Cl.
CPC ....... *G06Q 20/4014* (2013.01); *G06Q 20/322* (2013.01); *G06Q 40/00* (2013.01)

(58) Field of Classification Search
CPC .......................... G06Q 40/00; G06Q 20/4014
See application file for complete search history.

(56) References Cited

U.S. PATENT DOCUMENTS 7,014,107 B2  3/2006  Singer et al.
7,765,481 B2 * 7/2010  Dixon .................... G06Q 40/00
                                                        705/35

(Continued)

FOREIGN PATENT DOCUMENTS

CA  2738038 A1 *  3/2010  ........... G06Q 20/322
CA  2738038 C      3/2010

(Continued)

OTHER PUBLICATIONS

The University of Alaska staff, Managing Finance Reports with Vista Plus, Aug. 2008, The University of Alaska, web, 2-20 (Year: 2008).*

(Continued)

*Primary Examiner* — I Jung Liu

(57) ABSTRACT

A user verification method may comprise: by an application, performing an account verification on account information of a to-be-verified user; performing, based on a stored mobile phone number in the account information, a mobile phone number verification on a user terminal in which the application is located if the account verification succeeds; sending an identification code of the application and the stored mobile phone number to a back-end server of the application if the mobile phone number verification succeeds, and sending a verification request packet generated according to the identification code and basic information of the stored mobile phone number to a target base station; receiving the verification notification returned by the back-end server, and determining, according to the verification notification, whether the verification of the to-be-verified user succeeds; and performing a fast payment signing process to generate a fast payment agreement when the verification of the to-be-verified user succeeds.

20 Claims, 6 Drawing Sheets

(56) References Cited

U.S. PATENT DOCUMENTS

| | | | |
|---|---|---|---|
| 8,087,582 B2 | 1/2012 | Hammad et al. | |
| 8,181,858 B2 | 5/2012 | Carter et al. | |
| 9,160,741 B2 | 10/2015 | Wentker et al. | |
| 9,213,977 B2 | 12/2015 | Hammad et al. | |
| 10,346,837 B2 | 7/2019 | Steele et al. | |
| 2008/0005006 A1* | 1/2008 | Tritt | G06Q 40/00 705/36 R |
| 2011/0184858 A1 | 7/2011 | Shakkarwar | |
| 2013/0138565 A1 | 5/2013 | Dixon et al. | |
| 2019/0279188 A1 | 9/2019 | Aabye et al. | |

FOREIGN PATENT DOCUMENTS

| | | | | |
|---|---|---|---|---|
| CN | 102256001 B | | 6/2013 | |
| CN | 102256001 B | * | 6/2013 | |
| CN | 104065639 A | | 9/2014 | |
| CN | 105741116 A | | 7/2016 | |
| CN | 105825377 A | | 8/2016 | |
| CN | 106097051 A | | 11/2016 | |
| CN | 101512957 B | | 12/2017 | |
| CN | 101512957 B | * | 12/2017 | |
| CN | 107886320 A | | 4/2018 | |
| WO | 2002052879 A1 | | 7/2002 | |
| WO | WO-02052879 A1 | * | 7/2002 | ........... G06Q 20/367 |
| WO | 2005079254 A2 | | 9/2005 | |
| WO | WO-2005079254 A2 | * | 9/2005 | ............. G06Q 20/12 |
| WO | 2007149830 A2 | | 12/2007 | |
| WO | WO-2007149830 A2 | * | 12/2007 | ............... H04L 9/32 |
| WO | 2010070099 A1 | | 6/2010 | |
| WO | WO-2010070099 A1 | * | 6/2010 | ......... G06Q 20/3674 |

OTHER PUBLICATIONS

First Search for Chinese Application No. 201910283959.3 dated May 25, 2020.

* cited by examiner

VERIFICATION METHOD AND APPARATUS FOR USER SIGNING FAST PAYMENT WITH BANK CARD

CROSS-REFERENCE TO RELATED APPLICATION

This application is a continuation of International Patent Application No. PCT/CN2020/071161, filed on Jan. 9, 2020, which is based on and claims priority to and benefit of Chinese Patent Application No. 201910283959.3, filed with China National Intellectual Property Administration (CNIPA) of People's Republic of China on Apr. 10, 2019. The entire disclosures of all of the above-identified applications are incorporated herein by reference.

TECHNICAL FIELD

The present specification relates to the field of computer technologies, and in particular, to a verification method for user signing fast payment with a bank card and an apparatus thereof.

BACKGROUND

With the continuous development of Internet technologies, online shopping has become a common shopping manner for general public. It is inevitable to resolve payment problems in online shopping. Currently, common payment methods include Internet banking payment and fast payment. Because the fast payment method does not need to subscribe to Internet banking, and has a convenient and fast operation procedure and a higher security factor, it becomes popular quickly. Before the fast payment is adopted, signing fast payment of a bank card needs to be completed to generate a fast payment agreement. However, a user verification process is an important step in signing the fast payment of the bank card.

A common user verification manner may include that a user fills an application (such as a payment platform), with four essential elements of a bank card that the user wants to sign in, that is, the name of the user, a type of an identification (ID) of the user, an ID number of the user, and a stored mobile phone number (to be specific, the mobile phone number that is stored when the user registers with the bank card). The four essential elements of the information are sent to a banking system, and the banking system delivers a short message service (SMS) verification code to the application after verification of the four essential elements succeeds. The user fills the application, with the SMS verification code. The application sends the SMS verification code filled by the user to the banking system. After the banking system successfully verifies the SMS verification code filled by the user, verification of the user is completed.

However, in the foregoing manner, in one aspect, the user needs to fill the four essential elements, and switches between different applications to remember and fill the SMS verification code. The user interaction is complicated, and the user may remember the SMS verification code incorrectly, resulting in a plurality of times of verification or unsuccessful verification and a poor user experience. In another aspect, in the foregoing user verification manner, both the verification of the four essential elements and delivery and verification of the SMS verification code require a plurality of times of interaction with the application, the banking system, an operator server, and a platform that sends and receives the SMS verification code. The high network latency reduces the efficiency of the user verification. In a further aspect, due to the maturity of Internet crimes and popularization of criminal tools such as a rogue base station, crimes for purposefully stealing user information and a card of the user emerge continuously. Therefore, data security in a user verification process needs to be improved.

SUMMARY

One or more embodiments of the present specification provide a user verification method and apparatus for signing a fast payment with a bank card, to solve the problems in the existing technology that in a user verification process, the user interaction is complicated, and the user may memorize an SMS verification code incorrectly, resulting in a plurality of times of verification or unsuccessful verification. The high network latency reduces the efficiency of user verification and security of data in a user verification process.

To solve the foregoing technical problems, the one or more embodiments of the present specification are implemented as follows.

According to a first aspect, the one or more embodiments of the present specification provide A verification method. The method may comprise: performing, by an application, an account verification on account information of a to-be-verified user; performing, by the application, based on a stored mobile phone number in the account information, a mobile phone number verification on a user terminal in which the application is located if the account verification succeeds; sending, by the application, an identification code of the application and the stored mobile phone number to a back-end server of the application if the mobile phone number verification succeeds, and sending a verification request packet generated according to the identification code and basic information of the stored mobile phone number to a target base station; receiving, by the application, the verification notification returned by the back-end server, and determining, according to the verification notification, whether the verification of the to-be-verified user succeeds; and performing a fast payment signing process to generate a fast payment agreement when the verification of the to-be-verified user succeeds. The the target base station is configured to verify validity of the stored mobile phone number according to the verification request packet, and send the verification request packet to an operator server if the validity of the stored mobile phone number is verified. The operator server is configured to verify validity of the target base station, and forward the received verification request packet to the back-end server if the validity of the target base station is verified. The back-end server is configured to perform a verification on the to-be-verified user to generate a verification notification according to the verification request packet sent by the operator server, and the identification code and the stored mobile phone number sent by the application.

In one or more embodiments of the present specification, the performing, by the application, based on a stored mobile phone number in the account information, a mobile phone number verification on a user terminal in which the application is located may comprise: obtaining, by the application, at least one mobile phone number of the user terminal in which the application is located; determining, by the application, whether the at least one mobile phone number of the user terminal comprises the stored mobile phone number; and determining, by the application, in response to determining that the at least one mobile phone number of the user terminal comprises the stored mobile phone number, whether the mobile phone number verification of the user terminal succeeds.

In one or more embodiments of the present specification, the sending a verification request packet generated according to the identification code and basic information of the stored mobile phone number to a target base station may comprise: assembling, by the application, the basic information of the stored mobile phone number and the identification code according to a preset format to generate the verification request packet; and sending, by the application, the verification request packet to the target base station.

In one or more embodiments of the present specification, the target base station is configured to verify validity of the stored mobile phone number according to the verification request packet by: parsing, by the target base station, the verification request packet to obtain the basic information of the stored mobile phone number; obtaining, by the target base station, verification information of each candidate mobile phone number from the operator server, wherein the verification information of each candidate mobile phone number comprises basic information and state information; matching, by the target base station, the stored mobile phone number with each candidate mobile phone number, and determining a candidate mobile phone number matching the stored mobile phone number as a to-be-compared mobile phone number; matching, by the target base station, the basic information of the stored mobile phone number with basic information of the to-be-compared mobile phone number, and determining state information of the to-be-compared mobile phone number as state information of the stored mobile phone number if the basic information of the stored mobile phone number matches the basic information of the to-be-compared mobile phone number; determining, by the target base station, according to the state information of the stored mobile phone number, whether the stored mobile phone number is in a preset state; and determining, in response to determining that the stored mobile phone number is in the preset state, whether the validity of the stored mobile phone number is verified.

In one or more embodiments of the present specification, the operator server is configured to verify validity of the target base station by: obtaining, by the operator server, verification information of the target base station; and determining, by the operator server, according to the verification information of the target base station and verification information of each candidate base station in the operator server, whether the validity of the target base station is verified.

In one or more embodiments of the present specification, the sending, by the application, an identification code of the application and the stored mobile phone number to a back-end server of the application if the mobile phone number verification succeeds may comprise: displaying, by the application, an inquiry request about whether to perform the verification through the stored mobile phone number to the to-be-verified user if the mobile phone number verification succeeds; and receiving, by the application, response information of the to-be-verified user based on the inquiry request, and sending the identification code of the application and the stored mobile phone number to the back-end server of the application if the response information includes a confirmation message.

In one or more embodiments of the present specification, the back-end server is configured to perform the verification on the to-be-verified user to generate the verification notification according to the verification request packet sent by the operator server and the identification code and the stored mobile phone number sent by the application by: parsing, by the back-end server, the verification request packet to obtain basic information of a stored mobile phone number corresponding to the verification request packet and an identification code corresponding to the verification request packet; matching, by the back-end server, the stored mobile phone number and the identification code corresponding to the verification request packet with the stored mobile phone number and the identification code sent by the application to generate a matching result; and determining, by the back-end server, the verification notification according to the matching result.

According to a second aspect, the one or more embodiments of the present specification provide a verification device. The verification device may comprise: at least one processor; and a memory storing computer-executable instructions executable by the at least one processor to cause the at least one processor to perform operations including: performing, by an application, an account verification on account information of a to-be-verified user; performing, by the application, based on a stored mobile phone number in the account information, a mobile phone number verification on a user terminal in which the application is located if the account verification succeeds; sending, by the application, an identification code of the application and the stored mobile phone number to a back-end server of the application if the mobile phone number verification succeeds, and sending a verification request packet generated according to the identification code and basic information of the stored mobile phone number to a target base station; receiving, by the application, the verification notification returned by the back-end server, and determining, according to the verification notification, whether the verification of the to-be-verified user succeeds; and performing, by the application, a fast payment signing process to generate a fast payment agreement when the verification of the to-be-verified user succeeds. The target base station is configured to verify validity of the stored mobile phone number according to the verification request packet, and send the verification request packet to an operator server if validity of the mobile phone number is verified, wherein the at least one processor comprises the back-end server and the operator server. The operator server is configured to verify validity of the target base station, and forward the received verification request packet to the back-end server if the validity of the target base station is verified. The back-end server is configured to perform a verification on the to-be-verified user to generate a verification notification according to the verification request packet sent by the operator server, and the identification code and the stored mobile phone number sent by the application.

According to another aspect, the one or more embodiments of the present specification provide a non-transitory computer-readable storage medium. The non-transitory computer-readable storage medium may store computer instructions executable by at least one processor to cause the at least one processor to perform operations. The operations may comprise: performing, by an application, an account verification on account information of a to-be-verified user; performing, by the application, based on a stored mobile phone number in the account information, a mobile phone number verification on a user terminal in which the application is located if the account verification succeeds; sending, by the application, an identification code of the application and the stored mobile phone number to a back-end server of the application if the mobile phone number verification succeeds, and sending a verification request packet generated according to the identification code and basic information of the stored mobile phone number to a target base station; receiving, by the application, the verification notification returned by the back-end server, and determining, according to the verification notification, whether the verification of the to-be-verified user succeeds; and performing, by the application, a fast payment signing process to generate a fast payment agreement when the verification of the to-be-verified user succeeds. The target base station is configured to verify validity of the stored mobile phone number according to the verification request packet, and send the verification request packet to an operator server if validity of the mobile phone number is verified, wherein the at least one processor comprises the back-end server and the operator server. The operator server is configured to verify validity of the target base station, and forward the received verification request packet to the back-end server if the validity of the target base station is verified. The back-end server is configured to perform a verification on the to-be-verified user to generate a verification notification according to the verification request packet sent by the operator server, and the identification code and the stored mobile phone number sent by the application.

Technical solutions of the one or more embodiments of the present specification are adopted. After verification on account information of a to-be-verified user by an application based on a banking system succeeds and verification on a mobile phone number of a user terminal by the application succeeds, an identification code of the application and a stored mobile phone number are sent to a back-end server of the application, and a verification request packet generated according to the identification code of the application and basic information of the stored mobile phone number is sent to a target base station. After validity of the stored mobile phone number is verified by the target base station based on the verification request packet, the verification request packet is sent to an operator server by the target base station. After validity of the target base station is verified by the operator server, the verification request packet is forwarded to the back-end server. The back-end server verifies the to-be-verified user according to the identification code and the stored mobile phone number that are sent by the application and the verification request packet sent by the operator server, and the application determines, according to a verification notification sent by the back-end server, whether verification of the to-be-verified user succeeds. In an aspect, compared with the existing technology, only the account information needs to be provided by the to-be-verified user in an entire verification process of the embodiments, to automatically verify the to-be-verified user. At the same time, because there is no need for the to-be-verified user to switch between different applications to remember and fill with an SMS verification code, which greatly simplifies interactive operations of the to-be-verified user, avoids a situation of memorizing the SMS verification code incorrectly, increases efficiency and a success rate of the verification, and has better user experience. In another aspect, in the foregoing verification process of the to-be-verified user, interactions between the application, the target base station, the operator server, and the back-end server of the application are reduced, network latency is reduced, and efficiency of user check is improved. In a further aspect, in the foregoing verification process, only through a joint interaction and mutual restriction between the application, the target base station, the operator server, and the back-end server, the to-be-verified user can be verified, so as to improve security of data in the entire verification process.

BRIEF DESCRIPTION OF THE DRAWINGS

To describe one or more embodiments of the present specification or the technical solutions in the existing technology more clearly, the accompanying drawings required for describing the embodiments of the present specification or the existing technology are briefly introduced as follows. Apparently, the accompanying drawings in the following description show merely some embodiments in one or more embodiments of the present specification, and a person of ordinary skill in the art may still derive other drawings from these accompanying drawings without creative efforts.

DETAILED DESCRIPTION OF THE INVENTION

One or more embodiments of the present specification provide a user verification method and an apparatus for signing a fast payment with a bank card, to solve problems in the existing technology that in a user verification process, a user interaction is complicated, and the user may memorize an SMS verification code incorrectly. It may result in a plurality of times of verification or unsuccessful verification, and a high network latency which reduce the efficiency of user verification and security of data in a user verification process.

For a person skilled in the art to understand the technical solutions in one or more embodiments of the present specification better, the following description clearly and completely describes the technical solutions in the one or more embodiments of the present specification with reference to the accompanying drawings in the one or more embodiments of the present specification. Apparently, the described embodiments are merely some but not all of the embodiments of the present specification. All other embodiments obtained by a person of ordinary skill in the art based on the one or more embodiments of the present specification without creative efforts shall fall within the protection scope of the one or more embodiments of the present specification.

Figure 1:
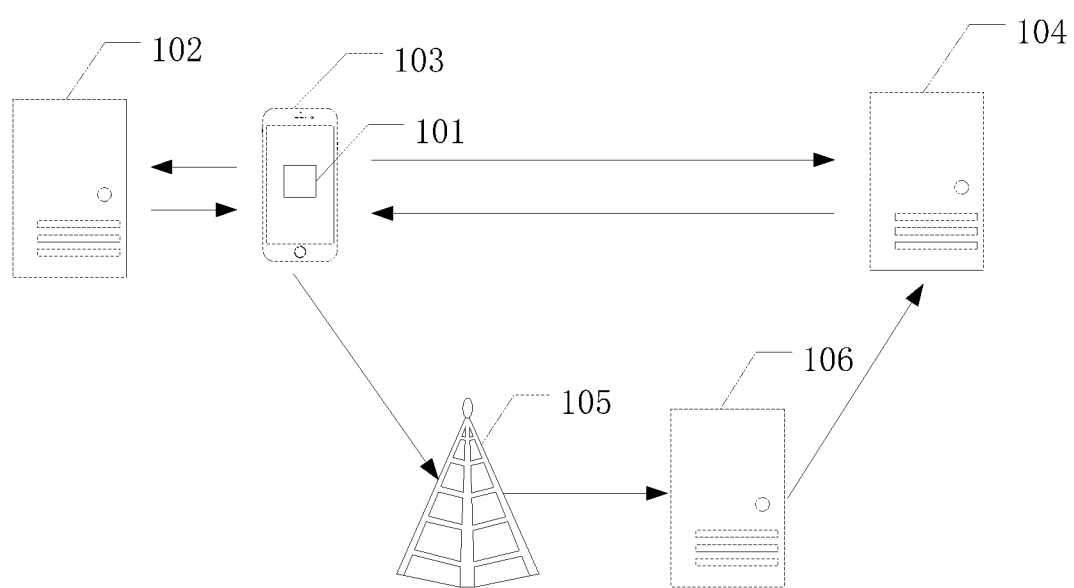
FIG. 1 is a schematic diagram of an application scenario of a user verification method for signing a fast payment with a bank card, according to one or more embodiments of the present specification.

FIG. 1 is a schematic diagram of an application scenario of a user verification method for signing a fast payment with a bank card, according to one or more embodiments of the present specification. As shown in FIG. 1, an application 101 (for example, a payment-type application) obtains account information of a to-be-verified user, and sends the account information to a banking system 102. The banking system 102 performs an account verification on the account information, and sends a notification of a successful account verification to the application 101 if the account verification succeeds. The application 101 receives and responds to the notification of successful account verification, and performs, based on a stored mobile phone number in the account information, a mobile phone number verification on a user terminal 103 in which the application 101 is located, that is, determines whether mobile phone numbers in the user terminal 103 include the stored mobile phone number. If the mobile phone numbers in the user terminal 103 include the stored mobile phone number, it is determined that the mobile phone number verification of the user terminal 103 succeeds. If the mobile phone numbers in the user terminal 103 do not include the stored mobile phone number, it is determined that the mobile phone number verification of the user terminal 103 fails. The application 101 sends an identification code of the application 101 and the stored mobile phone number to a back-end server 104 of the application 101 if the mobile phone number verification succeeds, generates a verification request packet according to the identification code of the application 101 and basic information of the stored mobile phone number, and sends the verification request packet to a target base station 105. The target base station 105 verifies validity of the stored mobile phone number based on the verification request packet, and the target base station 105 sends the verification request packet to an operator server 106 if the verification succeeds. The operator server 106 verifies validity of the target base station 105, and the operator server 106 sends the verification request packet to the back-end server 104 if the verification succeeds. The back-end server 104 verifies the to-be-verified user according to the identification code of the application 101, the stored mobile phone number sent by the application 101, and the verification request packet sent by the operator server 106, and sends a verification notification to the application 101. The application 101 determines, according to the verification notification, whether verification of the to-be-verified user succeeds. After the verification of the to-be-verified user succeeds, a fast payment signing process may be performed, to generate a fast payment agreement.

Figure 2:
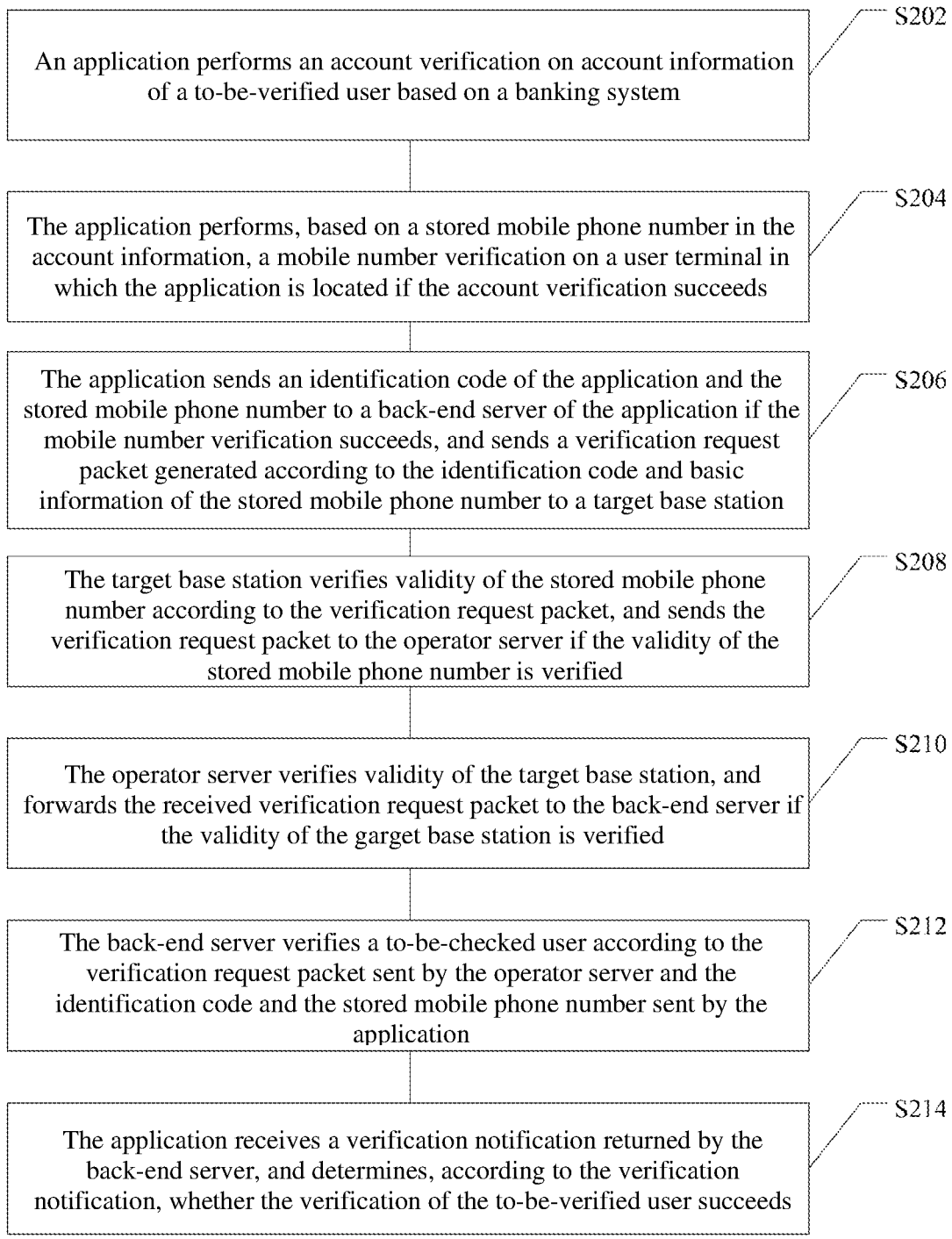
FIG. 2 is a flowchart of a user verification method for signing a fast payment with a bank card, according to one or more embodiments of the present specification.

FIG. 2 is a schematic flowchart of a user verification method for signing a fast payment with a bank card, according to one or more embodiments of the present specification. As shown in FIG. 2, the method may include the following steps.

In Step S202, an application performs an account verification on account information of a to-be-verified user based on a banking system.

In the embodiment, the application receives and responds to a user verification request based on signing the fast payment with the bank card, provides the to-be-verified user with an account information input page for the to-be-verified user to input the account information on the account information input page, and obtains the account information of the to-be-verified user from the account information input page. The account information may refer to information input by the to-be-verified user when registering a bank card, and the account information of the to-be-verified user may include the name of the to-be-verified user, the type of the identification of the to-be-verified user (for example, an ID card or a military ID card), the number of the identification of the to-be-verified user (for example, an ID number or a military ID number), a stored mobile phone number (such as, a mobile phone number stored when registering a bank card), or the like, which is not specifically limited in the embodiment. The account information of the to-be-verified user is sent to the banking system, wherein the banking system herein refers to a banking system corresponding to the bank card corresponding to the account information. The banking system compares the account information of the to-be-verified user with the account information stored in the banking system by the to-be-verified user when registering the bank card. If the comparison is successful, such that the acquired account information matches the stored account information, it is determined that the account verification of the account information of the to-be-verified user succeeds, and a notification of a successful account verification is sent to the application. If the comparison is not successful, such that the acquired account information does not match the stored account information, it is determined that the account verification of the account information of the to-be-verified user fails, and a notification of an unsuccessful account verification is sent to the application.

It should be noted that the application may include a payment-type application or the like, which is not specifically limited in the embodiment.

In Step S204, the application performs, based on a stored mobile phone number in the account information, a mobile phone number verification on a user terminal in which the application is located if the account verification succeeds.

In the embodiment of the present specification, if the application receives a notification of a successful account verification returned by a banking system, it is determined that the account verification succeeds. The application, based on a stored mobile phone number in the account information, performs a mobile phone number verification on the user terminal in which the application is located, may include: obtaining, by the application, mobile phone numbers in the user terminal in which the application is located (that is, the user terminal in which the application is installed); determining, by the application, whether the mobile phone numbers in the user terminal include the stored mobile phone number; and determining, according to a determination result, whether the mobile phone number verification of the user terminal succeeds. Specifically, if there is only one mobile phone number in the user terminal, whether the mobile phone number is the same as the stored mobile phone number is determined. If the mobile phone number is the same as the stored mobile phone number, it is determined that the mobile phone number verification of the user terminal succeeds. If the mobile phone number is different from the stored mobile phone number, it is determined that the mobile phone number verification of the user terminal fails. If there are a plurality of mobile phone numbers in the user terminal, whether the mobile phone numbers in the user terminal include a mobile phone number same as the stored mobile phone number is determined. If the mobile phone numbers in the user terminal include a mobile phone number same as the stored mobile phone number, it is determined that the mobile phone number verification of the user terminal succeeds. If the mobile phone numbers in the user terminal do not include a mobile phone number same as the stored mobile phone number, it is determined that the mobile phone number verification of the user terminal fails.

It can be learned from the above that, based on the stored mobile phone number, verifying the mobile phone numbers on the user terminal in which the application is located, may include determining whether the mobile phone numbers in the user terminal include the stored mobile phone number. When the mobile phone numbers in the user terminal include the stored mobile phone number, a further verification may be performed to avoid a situation that criminals misuse the stored mobile phone number for the verification, and to ensure the data security in the verification of the to-be-verified user.

In Step S206, the application sends an identification code of the application and the stored mobile phone number to a back-end server of the application if the mobile phone number verification succeeds, and sends a verification request packet generated according to the identification code and basic information of the stored mobile phone number to a target base station.

In the embodiment of the present specification, the application may send the identification code of the application and the stored mobile phone number to the back-end server of the application through mobile data of the user terminal if the mobile phone number verification of the user terminal succeeds, assemble the basic information of the stored mobile phone number and the identification code of the application according to a preset format to generate a verification request packet, and send the verification request packet to the target base station. The basic information of the stored mobile phone number may include the stored mobile phone number and SIM card information corresponding to the stored mobile phone number. When the application accesses an operator server (i.e., an operator server of the stored mobile phone number), an APPID (an application identity) or an APPKEY (an application key) may be obtained as a unique identifier for identifying the application to the operator server. Therefore, the APPID and/or the APPKEY may be used as the identification code of the application. It should be noted that the identification code of the application is not limited thereto. The preset format may be set according to a format requirement of a packet received by the target base station. It should be noted that the target base station may refer to a base station that receives the verification request packet.

Further, to improve the user experience, if the mobile phone number verification succeeds, sending, by the application, an identification code of the application and the stored mobile phone number to a back-end server of the application may include: displaying, by the application, an inquiry request about whether to verify through the stored mobile phone number to a to-be-verified user if the mobile phone number verification succeeds; receiving, by the application, an response information, responding to the inquiry request from the to-be-verified user; and sending the identification code of the application and the stored mobile phone number to the back-end server of the application if the response information is confirmation information.

In the embodiment of the present specification, the application may generate and display the inquiry request about whether to verify through the stored mobile phone number if the mobile phone number verification succeeds, and the inquiry request may be displayed in a form of a text, a picture, or the like, which is not specifically limited in the embodiment. The to-be-verified user makes an answering operation based on the inquiry request, and the application responds to the answering operation to obtain the response information. The identification code of the application and the stored mobile phone number are sent to the back-end server of the application if the response information is the confirmation information.

It can be learned from the above that, after the mobile phone number verification succeeds, by generating and displaying the inquiry request, and making a corresponding operation according to the response information of the to-be-verified user based on the inquiry request, whether to perform a next operation according to intention of the to-be-verified user may be determined, thereby improving the user experience.

In Step S208, the target base station verifies validity of the stored mobile phone number according to the verification request packet, and sends the verification request packet to the operator server if the validity of the stored mobile phone number is verified.

Figure 3:
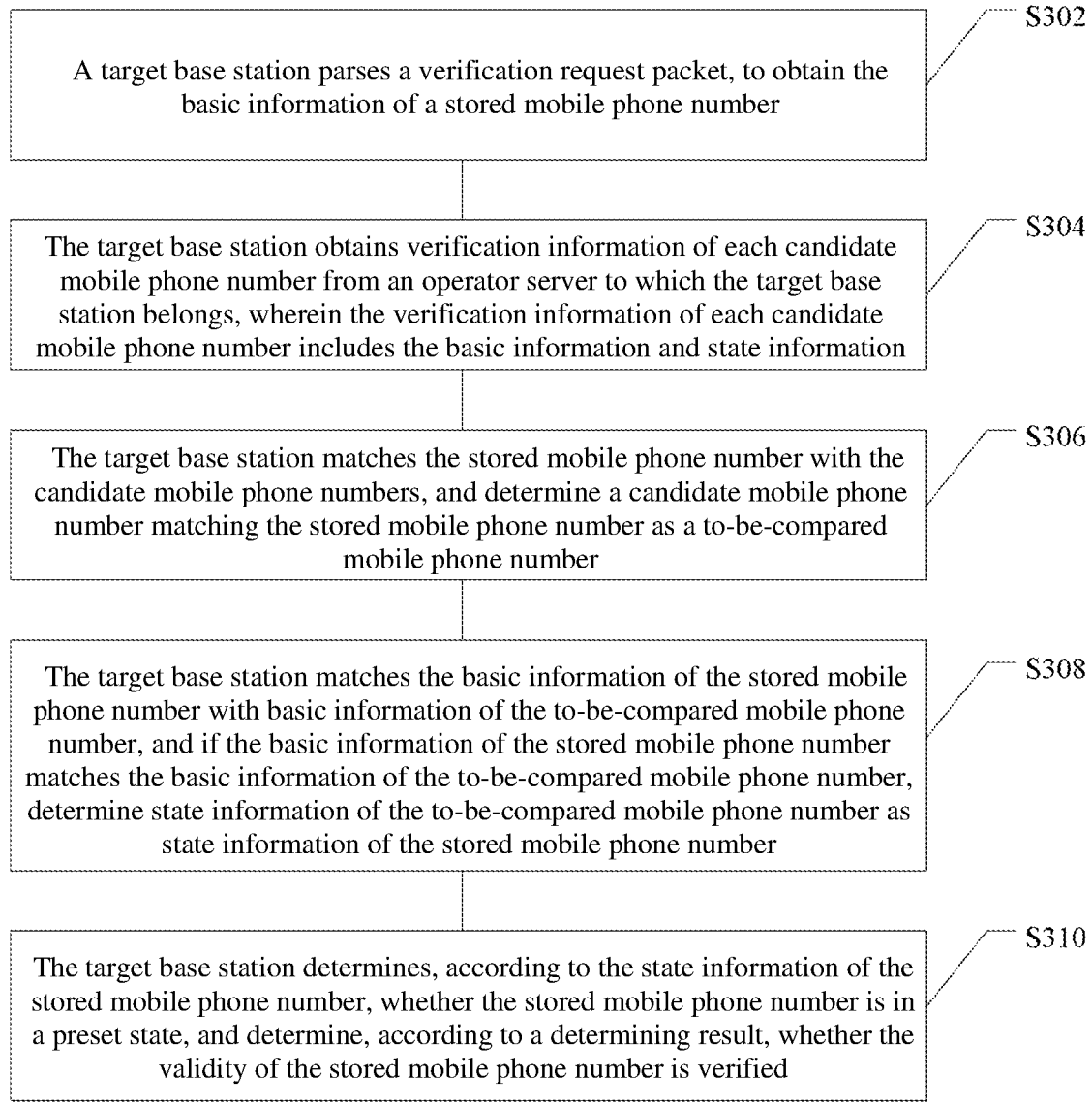
FIG. 3 is a flowchart of verifying, by a target base station, validity of a stored mobile phone number according to a verification request packet, according to one or more embodiments of the present specification.

In the embodiment of the present specification, FIG. 3 is a flowchart of verifying, by a target base station, validity of a stored mobile phone number according to a verification request packet, according to one or more embodiments of the present specification. As shown in FIG. 3, the following steps may be included.

In Step S302, a target base station parses a verification request packet, to obtain the basic information of the stored mobile phone number.

In the embodiment of the present specification, a process of parsing, by the target base station, the verification request packet may include disassembling the verification request packet according to an assembling manner of the verification request packet, to obtain the basic information of the stored mobile phone number. It should be noted that the basic information of the stored mobile phone number has been described above, and therefore the details are not described herein again.

In Step S304, the target base station obtains verification information of each candidate mobile phone number from the operator server to which the target base station belongs, where the verification information of each candidate mobile phone number includes the basic information and state information.

In the embodiment of the present specification, the verification information of each candidate mobile phone number is obtained from the operator server to which the target base station belongs (i.e., the operator server of the stored mobile phone number), and the verification information of each candidate mobile phone number may include the basic information and the state information. The basic information of a candidate mobile phone number may include a candidate mobile phone number and the SIM card information corresponding to the candidate mobile phone number, and the state information of the candidate mobile phone number may include permission information of each function of the candidate mobile phone number, such as the permission to make and receive a call, the permission to send and read an SMS message, or the like, which is not specifically limited in the embodiment. It should be noted that the candidate mobile phone number herein refers to a mobile phone number stored in the operator server. For purpose of distinguishing herein, the mobile phone numbers stored in the operator server are named as the candidate mobile phone numbers.

In Step S306, the target base station matches the stored mobile phone number with the candidate mobile phone numbers, and determine a candidate mobile phone number matching the stored mobile phone number as a to-be-compared mobile phone number, that is, determine the candidate mobile phone number same as the stored mobile phone number as the to-be-compared mobile phone number.

In Step S308, the target base station matches the basic information of the stored mobile phone number with basic information of the to-be-compared mobile phone number, and if the basic information of the stored mobile phone number matches the basic information of the to-be-compared mobile phone number, determine the state information of the to-be-compared mobile phone number as state information of the stored mobile phone number.

In the embodiment of the present specification, corresponding data in the basic information of the stored mobile phone number is matched with corresponding data in the basic information of the to-be-compared mobile phone number. If the corresponding data in the basic information of the stored mobile phone number and the corresponding data in the basic information of the to-be-compared mobile phone number are matched, the state information of the to-be-compared mobile phone number is determined as the state information of the stored mobile phone number.

In Step S310, the target base station determines, according to the state information of the stored mobile phone number, whether the stored mobile phone number is in a preset state, and determine, according to a determination result, whether the validity of the stored mobile phone number is verified.

In the embodiment of the present specification, the preset state may be customized, which is not specifically limited in the embodiment. For example, the preset state may be the permission to make and receive a call, the permission to send and read an SMS message, and the permission to access the internet through mobile data. Whether the stored mobile phone number is in the preset state may be determined according to the permission information of each function in the state information of the stored mobile phone number. If the stored mobile phone number is in the preset state, it is determined that validity of the stored mobile phone number is verified. If the stored mobile phone number is not in the preset state, it is determined that the verification of the validity of the stored mobile phone number fails.

It can be learned from the above that, the validity of the stored mobile phone number in the verification request packet may be verified to ensure that the stored mobile phone number is valid, and further ensure the data security in the verification process.

In Step S210, the operator server verifies validity of the target base station, and forwards the received verification request packet to the back-end server if the validity is verified.

In the embodiment of the present specification, after receiving the verification request packet sent by the target base station, the operator server verifies the validity of the target base station. A process of verifying the validity of the target base station may include: obtaining, by the operator server, verification information of the target base station; and verifying, according to the verification information of the target base station and verification information of each candidate base station in the operator server, validity of the target base station. The verification information of the target base station may include location information of the target base station, service state information of the target base station, performance parameters of the target base station, and the like, which is not specifically limited in the embodiment. The verification information of the candidate base station may include location information of the candidate base station, service state information of the candidate base station, performance parameters of the candidate base station, and the like, which is not specifically limited in the embodiment. It should be noted that the operator server stores verification information of all base stations related to the operator server. For purpose of distinguishing herein, the base stations related to the operator server are named as the candidate base stations. The operator server obtains the verification information of the target base station from the target base station, and matches the verification information of the target base station with the verification information of each candidate base station in the operator server. If there is a candidate base station of which verification information matches the verification information of the target base station in the operator server, it is determined that the validity of the target base station is verified. If there is no candidate base station of which verification information matches the verification information of the target base station in the operator server, it is determined that the verification of the validity of the target base station fails.

It can be learned from the above that, the validity of the target base station is verified, and after the validity is verified, a next verification step is performed to ensure the validity of the target base station, thereby avoiding a situation that a rogue base station sends the verification request packet to the operator server, and further ensuring data security in the entire verification process.

In Step S212, the back-end server verifies a to-be-verified user according to the verification request packet sent by the operator server and the identification code and the stored mobile phone number sent by the application.

In the embodiment of the present specification, the back-end server parses the verification request packet sent by the operator server, to obtain the basic information of a stored mobile phone number corresponding to the verification request packet and an identification code corresponding to the verification request packet. The back-end server matches the stored mobile phone number corresponding to the verification request packet and the stored mobile phone number sent by the application, and matches the identification code corresponding to the verification request packet and the identification code sent by the application. If the stored mobile phone number corresponding to the verification request packet is the same as the stored mobile phone number sent by the application and the identification code corresponding to the verification request packet is the same as the identification code sent by the application, it is determined that the verification of the to-be-verified user succeeds, a verification notification of a successful verification is generated, and the verification notification of the successful verification is sent to the application. If the stored mobile phone number corresponding to the verification request packet is different from the stored mobile phone number sent by the application and/or the identification code corresponding to the verification request packet is different from the identification code sent by the application, it is determined that verification of the to-be-verified user fails, a verification notification of an unsuccessful verification is generated, and the verification notification of the unsuccessful verification is sent to the application.

In Step S214, the application receives a verification notification returned by the back-end server, and determines, according to the verification notification, whether the verification of the to-be-verified user succeeds.

In the embodiment of the present specification, the application receives the verification notification returned by the back-end server. If the verification notification is a verification notification of a successful verification, it is determined that the verification of the to-be-verified user succeeds. If the verification notification is a verification notification of an unsuccessful verification, it is determined that the verification of the to-be-verified user fails.

Compared with the existing technology, in the foregoing entire verification process, only the account information needs to be provided by the to-be-verified user to automatically verify the to-be-verified user. At the same time, because there is no need for the to-be-verified user to switch between different applications to remember and fill an SMS verification code, the interactive operation of the to-be-verified user is greatly simplified for avoiding a situation of incorrectly remembering the SMS verification code, thereby increasing efficiency and a success rate of the verification, and a better user experience. In addition, in the foregoing verification process of the to-be-verified user, the interaction between the application, the target base station, the operator server, and the back-end server of the application is reduced, the network latency is reduced, and the efficiency of user verification is improved. Moreover, in the foregoing verification process, only after the verifications of the account information and the mobile phone number of the user terminal by the application succeed, the validity of the stored mobile phone number is verified by the target base station, and the validity of the target base station is verified by the operator server, the back-end server may verify the to-be-verified user. To be specific, only through a joint interaction and a mutual restriction among the application, the target base station, the operator server, and the back-end server, the to-be-verified user can be checked, so as to improve the data security of the entire verification process.

It should be noted that when the to-be-verified user does not agree to use the stored mobile phone number to perform the verification, or the verification of the to-be-verified user fails because of the verification failure in any one of the foregoing verification steps, a risk assessment may be performed on the user terminal corresponding to the stored mobile phone number. After the risk assessment succeeds, and the verification of the four essential information elements of the banking system succeeds, the to-be-verified user is verified by sending a verification code to the stored mobile phone number. It should be noted that a process of performing the risk assessment on the user terminal corresponding to the stored mobile phone number may include: obtaining the device information of the user terminal corresponding to the stored mobile phone number; determining, according to the device information of the user terminal, a change frequency and a change time of the user terminal in which the stored mobile phone number is located; obtaining the location information of the network login of the user terminal corresponding to the stored mobile phone number, to determine whether there is a location abnormality of the user terminal corresponding to the stored mobile phone number; and finally, performing the risk assessment on the user terminal according to the change frequency and the change time of the user terminal and the location abnormality.

Figure 4:
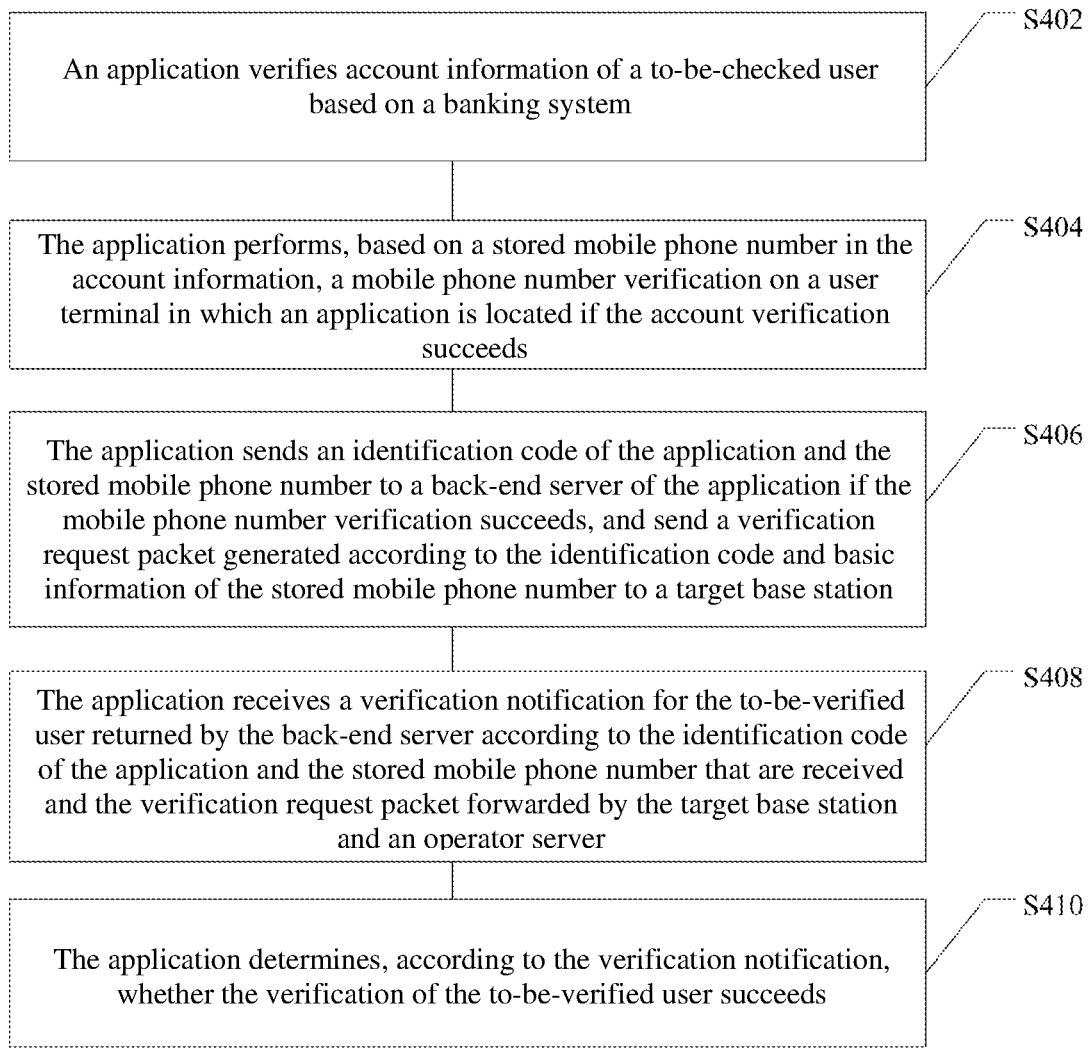
FIG. 4 is a flowchart of a user verification method for signing a fast payment with a bank card, according to one or more embodiments of the present specification.

FIG. 4 is a flowchart of a user verification method for signing a fast payment with a bank card, according to one or more embodiments of the present specification. The method may be applied to an application, and the application may be, for example, a payment-type application, which is not specifically limited in the embodiment. As shown in FIG. 4, the method may include the following steps.

In Step S402, an application verifies account information of a to-be-verified user based on a banking system. An implementation process of Step S402 has been described in Step S202 in the above, and therefore the details are not described herein again.

In Step S404, the application performs, based on a stored mobile phone number in the account information, a mobile phone number verification on a user terminal in which the application is located if the account verification succeeds.

In the embodiment of the present specification, the performing, based on a stored mobile phone number in the account information, a mobile phone number verification on a user terminal in which the application is located may include: obtaining mobile phone numbers in the user terminal in which the application is located; determining whether the mobile phone numbers in the user terminal include the stored mobile phone number; and determining, according to a determining result, whether the mobile phone number verification of the user terminal succeeds.

An implementation process of Step S404 has been described in Step S204 above, and therefore the details are not described herein again.

In Step S406, the application sends an identification code of the application and the stored mobile phone number to a back-end server of the application if the mobile phone number verification succeeds, and send a verification request packet generated according to the identification code and basic information of the stored mobile phone number to a target base station.

In the embodiment of the present specification, the sending a verification request packet generated according to the identification code and basic information of the stored mobile phone number to a target base station may include: assembling the basic information of the stored mobile phone number and the identification code according to a preset format to generate the verification request packet; and sending the verification request packet to the target base station.

It should be noted that an implementation process of Step S406 has been described in Step S206 in the above, and therefore the details are not described herein again.

Further, to improve the user experience, the sending an identification code of the application and the stored mobile phone number to a back-end server of the application if the mobile phone number verification succeeds may include: displaying an inquiry request about whether to perform the verification through the stored mobile phone number to a to-be-verified user if the mobile phone number verification succeeds; receiving response information of the to-be-verified user based on the inquiry request; and sending the identification code of the application and the stored mobile phone number to the back-end server of the application if the response information is confirmation information. It should be noted that the process has been described in detail above, and therefore the details are not described herein again.

In Step S408, the application receives a verification notification for the to-be-verified user returned by the back-end server according to the identification code of the application and the stored mobile phone number that are received and the verification request packet forwarded by the target base station and an operator server.

In the embodiment of the present specification, in Step S406, after the application sends the verification request packet to the target base station, the target base station verifies validity of the stored mobile phone number according to the verification request packet, and sends the verification request packet to the operator server after the validity of the stored mobile phone number is verified. After receiving the verification request packet sent by the target base station, the operator server verifies validity of the target base station, and sends the verification request packet to the back-end server of the application after the validity of the target base station is verified. The back-end server parses the verification request packet to obtain the basic information of a stored mobile phone number that corresponds to the verification request packet and an identification code that corresponds to the verification request packet, matches the stored mobile phone number corresponding to the verification request packet with the stored mobile phone number sent by the application, and matches the identification code corresponding to the verification request packet with the identification code sent by the application. If the stored mobile phone number corresponding to the verification request packet matches the stored mobile phone number sent by the application, and the identification code corresponding to the verification request packet matches the identification code sent by the application, it is determined that the verification of the to-be-verified user succeeds, a verification notification of a successful verification is generated, and the verification notification of the successful verification is sent to the application. If the stored mobile phone number corresponding to the verification request packet does not match the stored mobile phone number sent by the application, and/or the identification code corresponding to the verification request packet does not match the identification code sent by the application, it is determined that the verification of the to-be-verified user fails, a verification notification of an unsuccessful verification is generated, and the verification notification of the unsuccessful check is sent to the application.

In Step S410, the application determines, according to the verification notification, whether the verification of the to-be-verified user succeeds.

In the embodiment of the present specification, if the received verification notification sent by the back-end server is a verification notification of a successful verification, it is determined that verification of the to-be-verified user succeeds. If the received verification notification sent by the back-end server is a verification notification of an unsuccessful verification, it is determined that verification of the to-be-verified user fails.

Compared with the existing technology, in the entire verification process of the embodiment, only the account information needs to be provided by the to-be-verified user for automatically verifying the to-be-verified user. At the same time, because there is no need for the to-be-verified user to switch between different applications to remember and fill an SMS verification code, the interactive operation of the to-be-verified user is greatly simplified for avoiding a situation of incorrectly remembering the SMS verification code, increasing the efficiency and a success rate of the verification, and better user experience. In addition, in the foregoing verification process of the to-be-verified user, the interaction among the application, the target base station, the operator server, and the back-end server of the application is reduced, the network latency is reduced, and the efficiency of the user verification is improved. Moreover, in the foregoing verification process, only through the joint interaction and mutual restriction among the application, the target base station, the operator server, and the back-end server, the to-be-verified user can be verified, so as to improve the data security of the entire check process.

Figure 5:
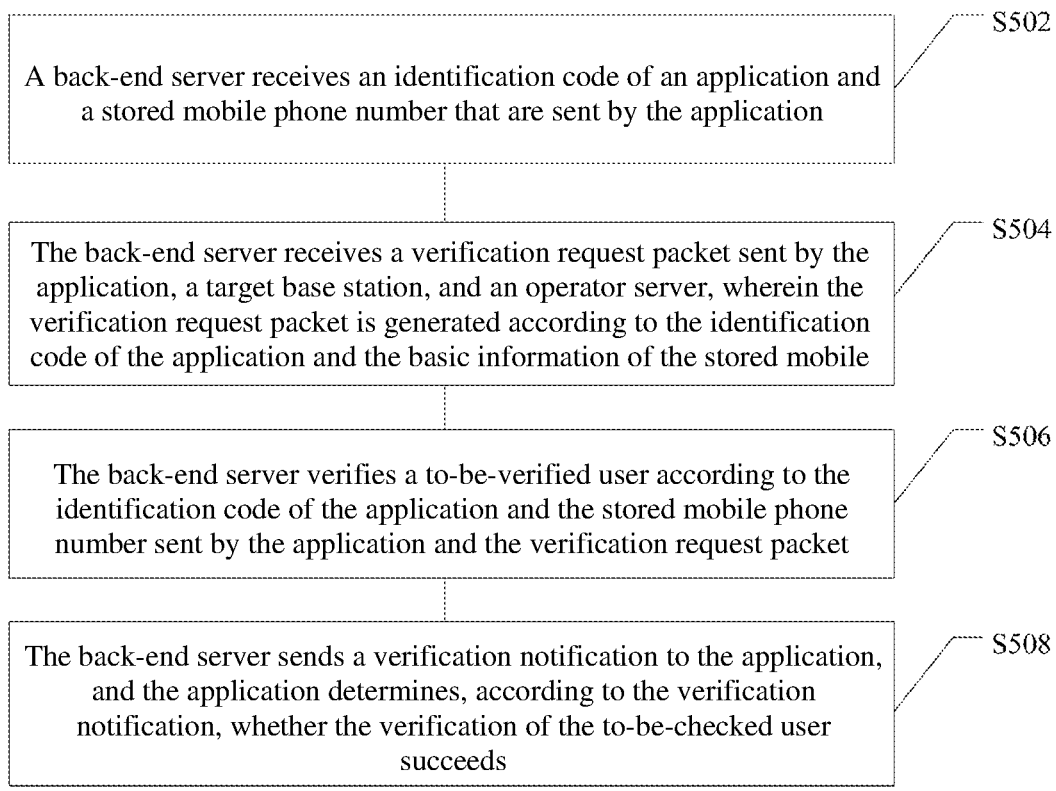
FIG. 5 is a flowchart of a user verification method for signing a fast payment with a bank card, according to one or more embodiments of the present specification.

FIG. 5 is a flowchart of a user verification method for signing a fast payment with a bank card, according to one or more embodiments of the present specification. The method may be applied to a back-end server of an application. As shown in FIG. 5, the method may include the following steps.

In Step S502, a back-end server receives an identification code of the application and a stored mobile phone number that are sent by the application.

In the embodiment of the present specification, the application performs an account verification on the account information of a to-be-verified user based on a banking system. After the account verification succeeds, the application performs, based on a stored mobile phone number in the account information, a mobile phone number verification on a user terminal in which the application is located. After the mobile phone number verification succeeds, the application sends the identification code of the application and the stored mobile phone number to a back-end server of the application. The back-end server receives the identification code of the application and the stored mobile phone number.

In Step S504, the back-end server receives a verification request packet sent by the application, a target base station, and an operator server, wherein the verification request packet is generated according to the identification code of the application and the basic information of the stored mobile phone number.

In the embodiment of the present specification, when sending the stored mobile phone number and the identification code of the application to the back-end server, the application generates the verification request packet according to the basic information of the stored mobile phone number and the identification code of the application, and sends the verification request packet to the target base station. The target base station verifies validity of the stored mobile phone number based on the verification request packet, and sends the verification request packet to the operator server after the validity of the stored mobile phone number is verified. The operator server verifies validity of the target base station, and sends the verification request packet to the back-end server after the validity of the target base station is verified. The back-end server receives the verification request packet sent by the operator server.

In Step S506, the back-end server verifies a to-be-verified user according to the identification code of the application and the stored mobile phone number sent by the application and the verification request packet.

In the embodiment of the present specification, first, the verification request packet is parsed to obtain information of a stored mobile phone number that corresponds to the verification request packet and an identification code that corresponds to the verification request packet. Then, the stored mobile phone number and the identification code corresponding to the verification request packet are matched with the stored mobile phone number and the identification code of the application sent by the application, respectively. Finally, a verification notification is determined according to a matching result. Specifically, matching between the stored mobile phone number corresponding to the verification request packet and the stored mobile phone number sent by the application and matching between the identification code corresponding to the verification request packet and the identification code sent by the application are performed. If the stored mobile phone number corresponding to the verification request packet and the stored mobile phone number sent by the application match and the identification code corresponding to the verification request packet and the identification code sent by the application match, it is determined that the verification of the to-be-verified user succeeds, and a verification notification of a successful verification is generated. If the stored mobile phone number corresponding to the verification request packet and the stored mobile phone number sent by the application do not match and/or the identification code corresponding to the verification request packet and the identification code sent by the application do not match, it is determined that verification of the to-be-verified user fails, and a verification notification of an unsuccessful verification is generated.

In Step S508, the back-end server sends a verification notification to the application. In the embodiment of the present specification, the verification notification is sent to the application, and the application determines, according to the verification notification, whether the verification of the to-be-verified user succeeds.

In the foregoing verification process of the to-be-verified user, interactions among the application, the target base station, the operator server, and the back-end server of the application are reduced, the network latency is reduced, and the efficiency of user verification is improved. In addition, in the foregoing verification process, only through a joint interaction and mutual restriction among the application, the target base station, the operator server, and the back-end server, the to-be-verified user can be verified, so as to improve data security of the entire verification process.

Figure 6:
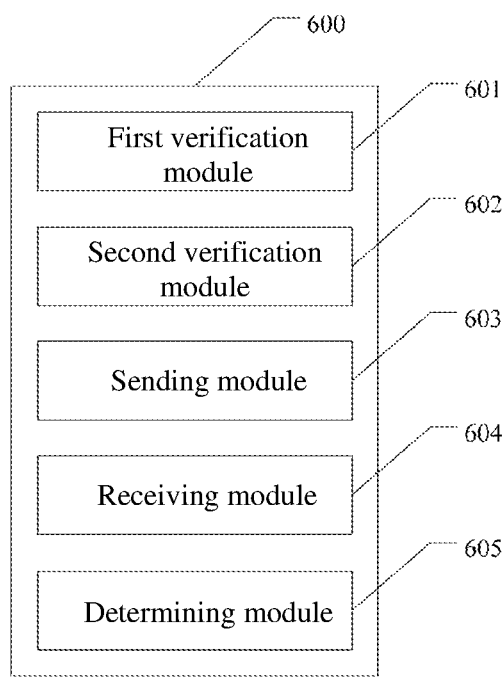
FIG. 6 is a structural block diagram of a user verification apparatus for signing a fast payment with a bank card, according to one or more embodiments of the present specification.

Corresponding to the foregoing user verification method based on signing fast payment of the bank card in FIG. 4, based on a same principle, an embodiment of the present specification further provides a user verification apparatus for signing a fast payment with a bank card applied to an application. FIG. 6 is a structural block diagram of a user verification apparatus for signing a fast payment with a bank card, according to one or more embodiments of the present specification. As shown in FIG. 6, the user verification apparatus 600 based on signing the fast payment of the bank card may include a first verification module 601, a second verification module 602, a sending module 603, a receiving module 604, and a determining module 605.

Wherein, the first verification module 601 may be configured to verify account information of a to-be-verified user based on a banking system.

The second verification module 602 may be configured to perform, based on a stored mobile phone number in the account information, a mobile phone number verification on a user terminal in which the application is located if the account verification succeeds.

The sending module 603 may be configured to send an identification code of the application and the stored mobile phone number to a back-end server of the application if the mobile phone number verification succeeds, and send a verification request packet generated according to the identification code and basic information of the stored mobile phone number to a target base station.

The receiving module 604 may be configured to receive a verification notification for the to-be-verified user returned by the back-end server according to the received identification code of the application and the stored mobile phone number and the verification request packet forwarded by the target base station and an operator server.

The determining module 605 may be configured to determine, according to the verification notification, whether verification of the to-be-verified user succeeds.

Further, the second verification module 602 may be configured to obtain mobile phone numbers in the user terminal in which the application is located, determine whether the mobile phone numbers in the user terminal include the stored mobile phone number, and determine, according to a determining result, whether the mobile phone number verification of the user terminal succeeds.

Further, the sending module 603 may be configured to assemble the basic information of the stored mobile phone number and the identification code according to a preset format to generate the verification request packet, and send the verification request packet to the target base station.

Furthermore, the sending module 603 may be configured to display an inquiry request about whether to perform the verification through the stored mobile phone number to the to-be-verified user if the mobile phone number verification succeeds, receive response information from the to-be-verified user based on the inquiry request, and send the identification code of the application and the stored mobile phone number to the back-end server of the application if the response information is confirmation information.

According to the user verification apparatus based on signing the fast payment with the bank card provided in the embodiment of the present specification, compared with the existing technology, in the embodiment, only the account information needs to be provided by the to-be-verified user in the entire verification process for automatically verifying the to-be-verified user. At the same time, because there is no need for the to-be-verified user to switch between different applications to remember and fill an SMS verification code, the interactive operation of the to-be-verified user is greatly simplified for avoiding a situation of incorrectly remembering the SMS verification code, thereby increasing the efficiency and a success rate of the verification, and a better user experience. In addition, in the foregoing verification process of the to-be-verified user, the interactions among the application, the target base station, the operator server, and the back-end server of the application are reduced, the network latency is reduced, and the efficiency of the user verification is improved. Moreover, in the foregoing verification process, only through a joint interaction and mutual restriction among the application, the target base station, the operator server, and the back-end server, the to-be-verified user can be verified, so as to improve data security of the entire verification process.

Figure 7:
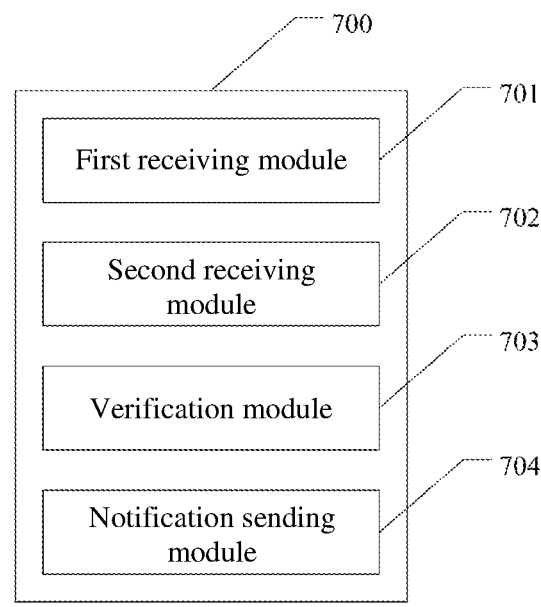
FIG. 7 is a structural block diagram of a user verification apparatus for signing a fast payment with a bank card, according to one or more embodiments of the present specification.

Corresponding to the foregoing user verification method based on signing the fast payment of the bank card in FIG. 5, based on a same principle, an embodiment of the present specification further provides a user verification apparatus for signing a fast payment with a bank card, applied to a back-end server of an application. FIG. 7 is a structural block diagram of a user verification apparatus for signing a fast payment with a bank card, according to one or more embodiments of the present specification. As shown in FIG. 7, the user verification apparatus 700 based on signing the fast payment of the bank card may include a first receiving module 701, a second receiving module 702, a verification module 703, and a notification sending module 704.

Wherein, the first receiving module 701 may be configured to receive an identification code of the application and a stored mobile phone number that are sent by the application.

The second receiving module 702 may be configured to receive a verification request packet sent by the application, a target base station, and an operator server, wherein the verification request packet is generated according to the identification code of the application and basic information of the stored mobile phone number.

The verification module 703 may be configured to verify a to-be-verified user according to the identification code of the application and the stored mobile phone number that are sent by the application and the verification request packet.

The notification sending module 704 may be configured to send a verification notification to the application.

Further, the verification module 703 may include:

a parsing unit, configured to parse the verification request packet to obtain basic information of a stored mobile phone number that corresponds to the verification request packet and an identification code that corresponds to the verification request packet;

a matching unit, configured to match the stored mobile phone number and the identification code that correspond to the verification request packet with the identification code of the application and the stored mobile phone number that are sent by the application, respectively; and a determining unit, configured to determine a verification notification according to a matching result.

According to the user verification apparatus based on signing the fast payment of the bank card provided in the embodiment of the present specification, in the foregoing verification process of the to-be-verified user, the interactions among the application, the target base station, the operator server, and the back-end server of the application are reduced, the network latency is reduced, and the efficiency of the user verification is improved. In addition, in the foregoing verification process, only through the joint interaction and mutual restriction among the application, the target base station, the operator server, and the back-end server, the to-be-verified user can be verified, so as to improve data security of the entire verification process.

Figure 8:
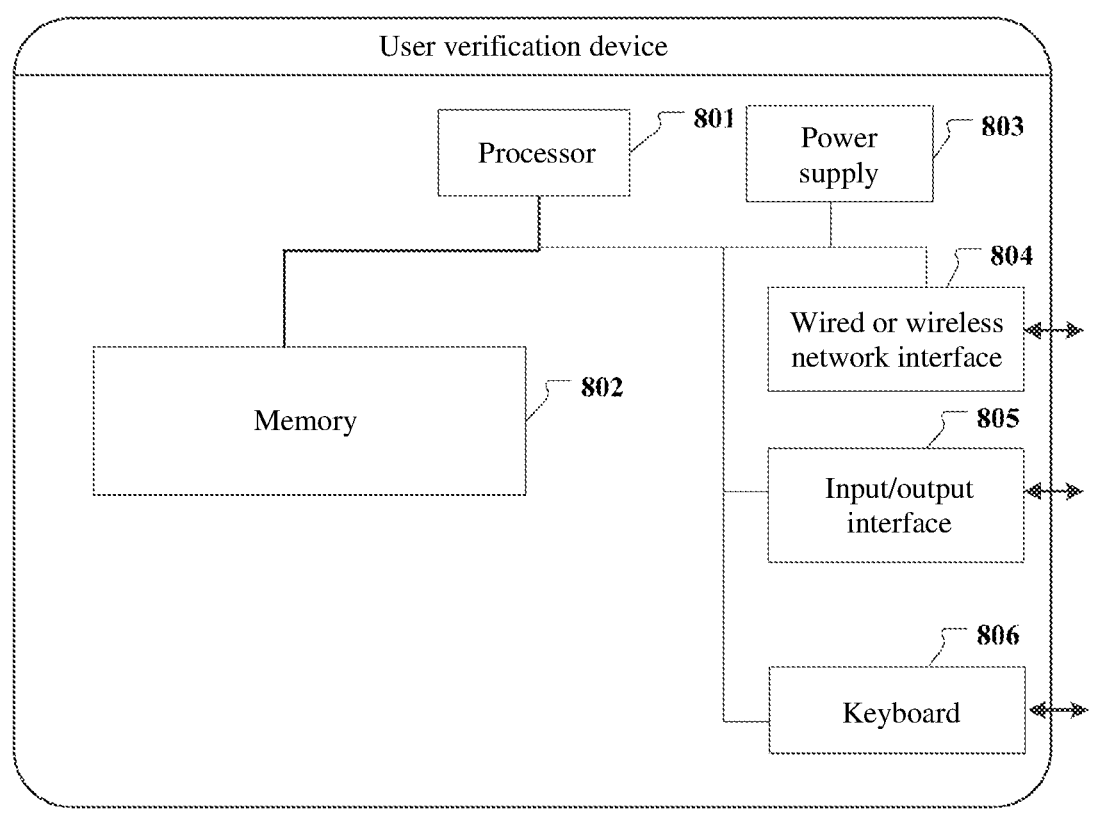
FIG. 8 is a schematic diagram of a user verification device for signing a fast payment with a bank card, according to an embodiment of the present specification.

Further, based on the foregoing method shown in FIG. 4, an embodiment of the present specification further provides a user verification device for signing a fast payment with a bank card. FIG. 8 is a schematic structural diagram of a user verification device for signing a fast payment with a bank card, according to an embodiment of the present specification. The device is configured to execute the foregoing user verification method based on the method of signing the fast payment of the bank card shown in FIG. 4.

As shown in FIG. 8, the user verification device based on signing the fast payment of the bank card may vary a lot due to different configurations or different performances, and may include one or more of the processors 801 and a memory 802. The memory 802 may store one or more application programs or data. The memory 802 may include a transient storage or a persistent storage. The application program stored in the memory 802 may include one or more modules (not shown in the figure), and each module may include a series of computer-executable instructions in the user verification device based on signing the fast payment of the bank card. Furthermore, the processor 801 may be configured to communicate with the memory 802, and execute, on the user verification device based on signing the fast payment of the bank card, the series of computer-executable instructions in the memory 802. The user verification device based on signing the fast payment of the bank card may further include one or more of the power supply 803, one or more of the wired or wireless network interface 804, one or more of the input/output interface 805, one or more of the keyboard 806, and the like.

In a specific embodiment, the user verification device based on signing the fast payment of the bank card includes a memory, and one or more programs, wherein the one or more programs are stored in the memory and may include one or more modules, and each module may include a series of computer-executable instructions in a user verification device. The one or more programs are configured to be executed by one or more processors, and include the computer-executable instructions used for performing the following operations:

verifying account information of a to-be-verified user based on a banking system;

performing, based on a stored mobile phone number in the account information, a mobile phone number verification on a user terminal in which the application is located if the account verification succeeds;

sending an identification code of the application and the stored mobile phone number to a back-end server of the application if the mobile phone number verification succeeds, and sending a verification request packet generated according to the identification code and basic information of the stored mobile phone number to a target base station;

receiving a verification notification for the to-be-verified user returned by the back-end server according to the identification code of the application and the stored mobile phone number that are received and the verification request packet forwarded by the target base station and an operator server; and determining, according to the verification notification, whether verification of the to-be-verified user succeeds.

Further, when the computer-executable instructions are executed, the performing, based on a stored mobile phone number in the account information, a mobile phone number verification on a user terminal in which the application is located includes:

obtaining mobile phone numbers in the user terminal in which the application is located; and determining whether the mobile phone numbers in the user terminal include the stored mobile phone number, and determining, according to a determining result, whether the mobile phone number verification of the user terminal succeeds.

Further, when the computer-executable instructions are executed, the sending a verification request packet generated according to the identification code and basic information of the stored mobile phone number to a target base station includes:

assembling the basic information of the stored mobile phone number and the identification code according to a preset format, to generate the verification request packet; and sending the verification request packet to the target base station.

Further, when the computer-executable instructions are executed, the sending an identification code of the application and the stored mobile phone number to a back-end server of the application if the mobile phone number verification succeeds includes:

displaying an inquiry request about whether to perform the verification through the stored mobile phone number to the to-be-verified user if the mobile phone number verification succeeds; and receiving response information of the to-be-verified user based on the inquiry request, and sending the identification code of the application and the stored mobile phone number to the back-end server of the application if the response information is confirmation information.

According to the user response device based on signing the fast payment of the bank card provided in the embodiment of the present specification, compared with the existing technology, in the embodiment, only the account information needs to be provided by the to-be-verified user in the entire verification process to automatically verify the to-be-verified user. At the same time, because there is no need for the to-be-verified user to switch between different applications to remember and fill with an SMS verification code, an interactive operation of the to-be-verified user is greatly simplified, a situation of incorrectly remembering the SMS verification code is avoided, the efficiency and a success rate of the verification are increased, and the user experience is improved. In addition, in the foregoing verification process of the to-be-verified user, interactions among the application, the target base station, the operator server, and the back-end server of the application are reduced, the network latency is reduced, and the efficiency of user verification is improved. Moreover, in the foregoing verification process, only through the joint interaction and mutual restriction among the application, the target base station, the operator server, and the back-end server, the to-be-verified user can be checked, so as to improve data security of the entire verification process.

Further, based on the foregoing method shown in FIG. 5, an embodiment of the present specification further provides a user verification device for signing a fast payment with a bank card. FIG. 8 is a schematic structural diagram of a user verification device for signing a fast payment with a bank card, according to an embodiment of the present specification. The device is configured to execute the foregoing user verification method based on signing the fast payment of the bank card in FIG. 5.

As shown in FIG. 8, the user verification device based on signing the fast payment of the bank card may vary a lot due to different configurations or different performance, and may include one or more of the processors 801 and a memory 802, and the memory 802 may store one or more application programs or data. The memory 802 may be a transient storage or a persistent storage. The application program stored in the memory 802 may include one or more modules (not shown in the figure), and each module may include a series of computer-executable instructions in the user verification device based on signing the fast payment of the bank card. Furthermore, the processor 801 may be configured to communicate with the memory 802, and execute the series of computer-executable instructions in the memory 802 on the user verification device based on signing the fast payment of the bank card. The user verification device based on signing the fast payment of the bank card may further include one or more of the power supply 803, one or more of the wired or wireless network interface 804, one or more of the input/output interface 805, one or more of the keyboard 806, and the like.

In a specific embodiment, the user verification device based on signing the fast payment of the bank card includes a memory, and one or more programs. The one or more programs are stored in the memory and may include one or more modules, and each module may include a series of computer-executable instructions in a user verification device. The one or more programs are configured to be executed by one or more processors, and include the computer-executable instructions used for performing the following operations:

receiving an identification code of an application and a stored mobile phone number that are sent by the application;

receiving a verification request packet sent by the application, a target base station, and an operator server, wherein the verification request packet is generated according to the identification code of the application and basic information of the stored mobile phone number;

verifying a to-be-verified user according to the identification code of the application and the stored mobile phone number that are sent by the application and the verification request packet; and sending a verification notification to the application.

Further, when the computer-executable instructions are executed, the verifying a to-be-verified user according to the identification code of the application and the stored mobile phone number that are sent by the application and the verification request packet includes:

parsing the verification request packet, to obtain basic information of a stored mobile phone number that corresponds to the verification request packet and an identification code that corresponds to the verification request packet;

matching the stored mobile phone number and the identification code that correspond to the verification request packet with the stored mobile phone number and the identification code of the application that are sent by the application, respectively; and determining a verification notification according to a matching result.

According to the user verification device based on signing the fast payment of the bank card provided in the embodiment of the present specification, in the foregoing verification process of the to-be-verified user, interactions among the application, the target base station, the operator server, and the back-end server of the application are reduced, the network latency is reduced, and the efficiency of user verification is improved. In addition, in the foregoing verification process, only through the joint interaction and mutual restriction among the application, the target base station, the operator server, and the back-end server, the to-be-verified user can be verified, so as to improve data security of the entire verification process.

Further, an embodiment of the present specification further provides a non-transitory computer-readable storage medium. The non-transitory computer-readable storage medium is configured to store computer-executable instructions. In an embodiment, the non-transitory computer-readable storage medium may be a USB flash drive, an optical disc, a hard disk, or the like, and the computer-executable instructions stored in the non-transitory computer-readable storage medium may implement the following process when being executed by a processor:

verifying account information of a to-be-verified user based on a banking system;

performing, based on a stored mobile phone number in the account information, a mobile phone number verification on a user terminal in which an application is located if the account verification succeeds;

sending an identification code of the application and the stored mobile phone number to a back-end server of the application if the mobile phone number verification succeeds, and sending a verification request packet generated according to the identification code and basic information of the stored mobile phone number to a target base station;

receiving a verification notification for the to-be-verified user returned by the back-end server according to the identification code of the application and the stored mobile phone number that are received and the verification request packet forwarded by the target base station and an operator server; and determining, according to the verification notification, whether the verification of the to-be-verified user succeeds.

Further, when the computer-executable instructions stored in the non-transitory computer-readable storage medium are executed by the processor, the performing, based on a stored mobile phone number in the account information, a mobile phone number verification on a user terminal in which the application is located includes:

obtaining mobile phone numbers in the user terminal in which the application is located; and determining whether the mobile phone numbers in the user terminal include the stored mobile phone number, and determining, according to a determining result, whether the mobile phone number verification of the user terminal succeeds.

Further, when the computer-executable instructions stored in the non-transitory computer-readable storage medium are executed by the processor, the sending a verification request packet generated according to the identification code and basic information of the stored mobile phone number to a target base station includes:

assembling the basic information of the stored mobile phone number and the identification code according to a preset format, to generate the verification request packet; and sending the verification request packet to the target base station.

Further, when the computer-executable instructions stored in the non-transitory computer-readable storage medium are executed by the processor, the sending an identification code of the application and the stored mobile phone number to a back-end server of the application if the mobile phone number verification succeeds includes:

displaying an inquiry request about whether to perform the verification through the stored mobile phone number to the to-be-verified user if the mobile phone number verification succeeds; and receiving response information from the to-be-verified user based on the inquiry request, and sending the identification code of the application and the stored mobile phone number to the back-end server of the application if the response information is confirmation information.

When the computer-executable instructions stored in the non-transitory computer-readable storage medium in the embodiment of the present specification are executed by the processor, compared with the existing technology, only the account information needs to be provided by the to-be-verified user in the entire verification process, to automatically verify the to-be-verified user. At the same time, because there is no need for the to-be-verified user to switch between different applications to remember and fill with an SMS verification code, an interactive operation of the to-be-verified user is greatly simplified, a situation of incorrectly remembering the SMS verification code is avoided, the efficiency and a success rate of the verification are increased, and the user experience is improved. In addition, in the foregoing verification process of the to-be-verified user, interactions among the application, the target base station, the operator server, and the back-end server of the application are reduced, the network latency is reduced, and the efficiency of user verification is improved. Moreover, in the foregoing verification process, only through the joint interaction and mutual restriction among the application, the target base station, the operator server, and the back-end server, the to-be-verified user can be verified, so as to improve data security of the entire verification process.

Further, an embodiment of the present specification provides a non-transitory computer-readable storage medium. The non-transitory computer-readable storage medium is configured to store computer-executable instructions. In an embodiment, the non-transitory computer-readable storage medium may be a USB flash drive, an optical disc, a hard disk, or the like, and the computer-executable instructions stored in the non-transitory computer-readable storage medium may implement the following process when being executed by a processor:

receiving an identification code of an application and a stored mobile phone number that are sent by the application;

receiving a verification request packet sent by the application, a target base station, and an operator server, wherein the verification request packet is generated according to the identification code of the application and basic information of the stored mobile phone number;

verifying a to-be-verified user according to the identification code of the application and the stored mobile phone number that are sent by the application and the verification request packet; and sending a verification notification to the application.

Further, when the computer-executable instructions stored in the non-transitory computer-readable storage medium are executed by the processor, the verifying a to-be-verified user according to the identification code of the application and the stored mobile phone number that are sent by the application and the verification request packet includes:

parsing the verification request packet, to obtain basic information of a stored mobile phone number that corresponds to the verification request packet and an identification code that corresponds to the verification request packet;

matching the stored mobile phone number and the identification code that correspond to the verification request packet with the stored mobile phone number and the identification code of the application stored mobile phone that are sent by the application, respectively; and determining a verification notification according to a matching result.

When the computer-executable instructions stored in the non-transitory computer-readable storage medium in the embodiment of the present specification are executed by the processor, in the foregoing verification process of the to-be-verified user, interactions among the application, the target base station, the operator server, and the back-end server of the application are reduced, the network latency is reduced, and the efficiency of user check is improved. In addition, in the foregoing verification process, only through the joint interaction and mutual restriction among the application, the target base station, the operator server, and the back-end server, the to-be-verified user can be verified, so as to improve data security of the entire verification process.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Almost all designers program an improved method procedure to a hardware circuit, to obtain a corresponding hardware circuit structure. Therefore, it does not mean that the improvement of a method procedure cannot be implemented by using modules of a hardware entity. For example, a programmable logic device (PLD) such as a field programmable gate array (FPGA) is a type of integrated circuit whose logic function is determined by a user by programming the device. The designers program a digital system to "integrate" the digital system into a single PLD without requiring a chip manufacturer to design and manufacture a dedicated integrated circuit chip. In addition, instead of making an integrated circuit chip manually, the programming is mostly implemented by using "logic compiler" software, which is similar to the software compiler used to write programs. Original codes before compiling are also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed by using the foregoing hardware description languages and then programmed into an integrated circuit, a hardware circuit that implements the logical method procedure can be easily obtained.

The controller can be implemented in any suitable manner, for example, the controller can be in a form of, for example, a microprocessor or processor and a computer-readable medium storing computer-readable program code (for example, software or firmware) executable by the processor, a logic gate, a switch, an application-specific integrated circuit (ASIC), a programmable logic controller, or an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as a part of the memory control logic. A person skilled in the art will also appreciate that, in addition to implementing the controller in the form of pure computer-readable program code, it is also possible to implement the controller in the form of a logic gate, a switch, an application-specific integrated circuit, a programmable logic controller, an embedded microcontroller, or other forms to achieve the same functions. Such a controller can thus be considered as a hardware component, and apparatuses included in the hardware component for implementing various functions can also be considered as structures of the hardware component. Alternatively, apparatuses configured to implement various functions can be considered as software modules implementing the method as well as the structures inside the hardware component.

The system, the apparatus, the module, or the unit described in the foregoing embodiments can be specifically implemented by a computer chip or an entity, or can be implemented by a product having certain functions. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the foregoing apparatus is described using various units that perform various functions. Certainly, during implementation of one or more embodiments of the present specification, the functions of each unit may be implemented in a same piece of or a plurality of pieces of software and/or hardware.

A person skilled in the art should understand that the one or more embodiments of the present specification may be provided as a method, a system, or a computer program product. Therefore, the one or more embodiments of the present specification may use embodiments in a form of hardware only, software only, or a combination of software and hardware. Moreover, the one or more embodiments of the present specification may use a form of a computer program product that is implemented on one or more computer-readable storage media (including but not limited to a disk memory, a CD-ROM, an optical memory, or the like) that includes computer-readable program codes.

The one or more embodiments of the present specification are described with reference to the flowcharts and/or block diagrams of the method, the device (system), and the computer program product according to the embodiments of the present specification. It should be understood that computer program instructions may be used to implement each process and/or each block in the flowcharts and/or block diagrams, or a combination of a process and/or a block in the flowcharts and/or the block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may also be stored in a computer readable memory that can guide a computer or another programmable data processing device to operate in a specific manner, so that the instructions stored in the computer readable memory generate a product including an instruction apparatus, wherein the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate procedures implemented by a computer, and instructions executed on the computer or another programmable data processing device provide steps for implementing functions specified in one or more procedures in the flowcharts and/or one or more blocks in the block diagrams.

In a typical configuration, a computing device includes one or more processors (CPU), an input/output interface, a network interface, and a memory.

The memory may include the following forms of computer readable media: a non-persistent memory, a random access memory (RAM), and/or a non-volatile memory, for example, a read-only memory (ROM) or a flash memory (flash RAM). The memory is an example of a computer readable medium.

The computer readable media may implement information storage using any method or technology, and may include persistent or non-persistent, and mobile or non-mobile media. The information may be a computer readable instruction, a data structure, a program module, or other data. Examples of computer storage media include, but not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present context, the computer-readable medium does not include transitory computer readable media (transitory media), such as a modulated data signal and a carrier.

It should also be noted that the terms "include", "comprise", and any other variants cover the non-exclusive inclusion. Thereby, the process, method, article, or device which include a series of elements not only include those elements, but also include other elements which are not explicitly listed, or include the inherent elements of the process, method, article and device. An element preceded by "includes a . . . " does not, without more constraints, preclude the existence of additional identical elements in the process, method, article, or apparatus that includes the element.

The one or more embodiments of the present specification can be described in the general context of computer-executable instructions executed by a computer, for example, a program module. Generally, the program module includes a routine, a program, an object, a component, a data structure, and the like for executing a particular task or implementing a particular abstract data type. This application may be practiced in distributed computing environments in which tasks are performed by remote processing devices that are connected through a communications network. In a distributed calculating environment, program modules may be located in both local and remote computer storage media including storage devices.

In the present specification, the embodiments are described in a progressive manner Same or similar part of the embodiments may be referred to each other. Each embodiment focuses on a difference from other embodiments. Especially, the system embodiment is basically similar to the method embodiments, and therefore it is described briefly. Relevant parts in the system embodiment may be referred to the description of the part of the method embodiments.

The foregoing descriptions are merely one or more embodiments of the present specification, and do not limit the present specification. For a person skilled in the art, various modifications and variations can be made to the one or more embodiments of the present specification. Any modification, equivalent replacement, or improvement made without departing from the spirit and principle of one or more embodiments of the present specification shall fall within the scope of the claims of one or more embodiments of the present specification.

What is claimed is:

1. A verification method comprising:
performing, by an application, an account verification on account information of a to-be-verified user;
performing, by the application, based on a stored mobile phone number in the account information, a mobile phone number verification on a user terminal in which the application is located if the account verification succeeds;
sending, by the application, an identification code of the application and the stored mobile phone number to a back-end server of the application if the mobile phone number verification succeeds, and sending a verification request packet generated according to the identification code and basic information of the stored mobile phone number to a target base station, wherein:
the target base station is configured to verify validity of the stored mobile phone number according to the verification request packet, and send the verification request packet to an operator server if the validity of the stored mobile phone number is verified;
the operator server is configured to verify validity of the target base station, and forward the received verification request packet to the back-end server if the validity of the target base station is verified; and
the back-end server is configured to perform a verification on the to-be-verified user to generate a verification notification according to the verification request packet sent by the operator server, and the identification code and the stored mobile phone number sent by the application;
receiving, by the application, the verification notification returned by the back-end server, and determining, according to the verification notification, whether the verification of the to-be-verified user succeeds; and
performing, by the application, a fast payment signing process to generate a fast payment agreement when the verification of the to-be-verified user succeeds.

2. The verification method according to claim 1, wherein the performing, by the application, based on a stored mobile phone number in the account information, a mobile phone number verification on a user terminal in which the application is located comprises:
obtaining, by the application, at least one mobile phone number of the user terminal in which the application is located;
determining, by the application, whether the at least one mobile phone number of the user terminal comprises the stored mobile phone number; and
determining, by the application, in response to determining that the at least one mobile phone number of the user terminal comprises the stored mobile phone number, whether the mobile phone number verification of the user terminal succeeds.

3. The verification method according to claim 1, wherein the sending a verification request packet generated according to the identification code and basic information of the stored mobile phone number to a target base station comprises:
assembling, by the application, the basic information of the stored mobile phone number and the identification code according to a preset format to generate the verification request packet; and
sending, by the application, the verification request packet to the target base station.

4. The verification method according to claim 1, wherein the target base station is configured to verify validity of the stored mobile phone number according to the verification request packet by:
parsing, by the target base station, the verification request packet to obtain the basic information of the stored mobile phone number;
obtaining, by the target base station, verification information of each candidate mobile phone number from the operator server, wherein the verification information of each candidate mobile phone number comprises basic information and state information;
matching, by the target base station, the stored mobile phone number with each candidate mobile phone number, and determining a candidate mobile phone number matching the stored mobile phone number as a to-be-compared mobile phone number;
matching, by the target base station, the basic information of the stored mobile phone number with basic information of the to-be-compared mobile phone number, and determining state information of the to-be-compared mobile phone number as state information of the stored mobile phone number if the basic information of the stored mobile phone number matches the basic information of the to-be-compared mobile phone number;

determining, by the target base station, according to the state information of the stored mobile phone number, whether the stored mobile phone number is in a preset state; and determining, in response to determining that the stored mobile phone number is in the preset state, whether the validity of the stored mobile phone number is verified.

5. The verification method according to claim 1, wherein the operator server is configured to verify validity of the target base station by:

obtaining, by the operator server, verification information of the target base station; and determining, by the operator server, according to the verification information of the target base station and verification information of each candidate base station in the operator server, whether the validity of the target base station is verified.

6. The verification method according to claim 1, wherein the sending, by the application, an identification code of the application and the stored mobile phone number to a back-end server of the application if the mobile phone number verification succeeds comprises:

displaying, by the application, an inquiry request about whether to perform the verification through the stored mobile phone number to the to-be-verified user if the mobile phone number verification succeeds; and receiving, by the application, response information of the to-be-verified user based on the inquiry request, and sending the identification code of the application and the stored mobile phone number to the back-end server of the application if the response information includes a confirmation message.

7. The verification method according to claim 1, wherein the back-end server is configured to perform the verification on the to-be-verified user to generate the verification notification according to the verification request packet sent by the operator server and the identification code and the stored mobile phone number sent by the application by:

parsing, by the back-end server, the verification request packet to obtain basic information of a stored mobile phone number corresponding to the verification request packet and an identification code corresponding to the verification request packet;

matching, by the back-end server, the stored mobile phone number and the identification code corresponding to the verification request packet with the stored mobile phone number and the identification code sent by the application to generate a matching result; and determining, by the back-end server, the verification notification according to the matching result.

8. A verification device comprising:
at least one processor; and
a memory storing computer-executable instructions executable by the at least one processor to cause the at least one processor to perform operations including:
performing, by an application, an account verification on account information of a to-be-verified user;
performing, by the application, based on a stored mobile phone number in the account information, a mobile phone number verification on a user terminal in which the application is located if the account verification succeeds;

sending, by the application, an identification code of the application and the stored mobile phone number to a back-end server of the application if the mobile phone number verification succeeds, and sending a verification request packet generated according to the identification code and basic information of the stored mobile phone number to a target base station, wherein:

the target base station is configured to verify validity of the stored mobile phone number according to the verification request packet, and send the verification request packet to an operator server if the validity of the stored mobile phone number is verified, wherein the at least one processor comprises the back-end server and the operator server;

the operator server is configured to verify validity of the target base station, and forward the received verification request packet to the back-end server if the validity of the target base station is verified; and the back-end server is configured to perform a verification on the to-be-verified user to generate a verification notification according to the verification request packet sent by the operator server, and the identification code and the stored mobile phone number sent by the application;

receiving, by the application, the verification notification returned by the back-end server, and determining, according to the verification notification, whether the verification of the to-be-verified user succeeds; and performing, by the application, a fast payment signing process to generate a fast payment agreement when the verification of the to-be-verified user succeeds.

9. The verification device according to claim 8, wherein the operations further comprise:

obtaining, by the application, at least one mobile phone number of the user terminal in which the application is located;

determining, by the application, whether the at least one mobile phone number of the user terminal comprises the stored mobile phone number; and determining, by the application, in response to determining that the at least one mobile phone number of the user terminal comprises the stored mobile phone number, whether the mobile phone number verification of the user terminal succeeds.

10. The verification device according to claim 8, wherein the operations further comprise: if the mobile phone number verification succeeds, assembling, by the application, the basic information of the stored mobile phone number and the identification code according to a preset format to generate the verification request packet; and sending, by the application, the verification request packet to the target base station.

11. The verification device according to claim 8, wherein the operations further comprise: if the validity of the stored mobile phone number is verified, parsing, by the target base station, the verification request packet to obtain the basic information of the stored mobile phone number;

obtaining, by the target base station, verification information of each candidate mobile phone number from the operator server, wherein the verification information of each candidate mobile phone number comprises basic information and state information;

matching, by the target base station, the stored mobile phone number with each candidate mobile phone number, and determining a candidate mobile phone number matching the stored mobile phone number as a to-be-compared mobile phone number;

matching, by the target base station, the basic information of the stored mobile phone number with basic information of the to-be-compared mobile phone number, and determining state information of the to-be-compared mobile phone number as state information of the stored mobile phone number if the basic information of the stored mobile phone number matches the basic information of the to-be-compared mobile phone number;

determining, by the target base station, according to the state information of the stored mobile phone number, whether the stored mobile phone number is in a preset state; and determining, in response to determining that the stored mobile phone number is in the preset state, whether the validity of the stored mobile phone number is verified.

12. The verification device according to claim 8, wherein the operations further comprise: if the validity of the target base station is verified, obtaining, by the operator server, verification information of the target base station; and determining, by the operator server, according to the verification information of the target base station and verification information of each candidate base station in the operator server, whether the validity of the target base station is verified.

13. The verification device according to claim 8, wherein the operations further comprise: if the mobile phone number verification succeeds, displaying, by the application, an inquiry request about whether to perform the verification through the stored mobile phone number to the to-be-verified user if the mobile phone number verification succeeds; and receiving, by the application, response information of the to-be-verified user based on the inquiry request, and sending the identification code of the application and the stored mobile phone number to the back-end server of the application if the response information includes a confirmation message.

14. The verification device according to claim 8, wherein the operations further comprise: if the mobile phone number verification succeeds, parsing, by the back-end server, the verification request packet to obtain basic information of a stored mobile phone number corresponding to the verification request packet and an identification code corresponding to the verification request packet;

matching, by the back-end server, the stored mobile phone number and the identification code corresponding to the verification request packet with the stored mobile phone number and the identification code sent by the application to generate a matching result; and determining, by the back-end server, the verification notification according to the matching result.

15. A non-transitory computer-readable storage medium storing computer instructions executable by at least one processor to cause the at least one processor to perform operations comprising:

performing, by an application, an account verification on account information of a to-be-verified user;

performing, by the application, based on a stored mobile phone number in the account information, a mobile phone number verification on a user terminal in which the application is located if the account verification succeeds;

sending, by the application, an identification code of the application and the stored mobile phone number to a back-end server of the application if the mobile phone number verification succeeds, and sending a verification request packet generated according to the identification code and basic information of the stored mobile phone number to a target base station, wherein:

the target base station is configured to verify validity of the stored mobile phone number according to the verification request packet, and send the verification request packet to an operator server if the validity of the stored mobile phone number is verified, wherein the at least one processor comprises the back-end server and the operator server;

the operator server is configured to verify validity of the target base station, and forward the received verification request packet to the back-end server if the validity of the target base station is verified; and the back-end server is configured to perform a verification on the to-be-verified user to generate a verification notification according to the verification request packet sent by the operator server, and the identification code and the stored mobile phone number sent by the application;

receiving, by the application, the verification notification returned by the back-end server, and determining, according to the verification notification, whether the verification of the to-be-verified user succeeds; and performing, by the application, a fast payment signing process to generate a fast payment agreement when the verification of the to-be-verified user succeeds.

16. The non-transitory computer-readable storage medium according to claim 15, wherein the operations further comprise:

obtaining, by the application, at least one mobile phone number of the user terminal in which the application is located;

determining, by the application, whether the at least one mobile phone number of the user terminal comprises the stored mobile phone number; and determining, by the application, in response to determining that the at least one mobile phone number of the user terminal comprises the stored mobile phone number, whether the mobile phone number verification of the user terminal succeeds.

17. The non-transitory computer-readable storage medium according to claim 15, wherein the operations further comprise: if the mobile phone number verification succeeds, assembling, by the application, the basic information of the stored mobile phone number and the identification code according to a preset format to generate the verification request packet; and sending, by the application, the verification request packet to the target base station.

18. The non-transitory computer-readable storage medium according to claim 15, wherein the operations further comprise: if the validity of the stored mobile phone number is verified, parsing, by the target base station, the verification request packet to obtain the basic information of the stored mobile phone number;

obtaining, by the target base station, verification information of each candidate mobile phone number from the operator server, wherein the verification information of each candidate mobile phone number comprises basic information and state information;

matching, by the target base station, the stored mobile phone number with each candidate mobile phone number, and determining a candidate mobile phone number matching the stored mobile phone number as a to-be-compared mobile phone number;

matching, by the target base station, the basic information of the stored mobile phone number with basic information of the to-be-compared mobile phone number, and determining state information of the to-be-compared mobile phone number as state information of the stored mobile phone number if the basic information of the stored mobile phone number matches the basic information of the to-be-compared mobile phone number;

determining, by the target base station, according to the state information of the stored mobile phone number, whether the stored mobile phone number is in a preset state; and determining, in response to determining that the stored mobile phone number is in the preset state, whether the validity of the stored mobile phone number is verified.

19. The non-transitory computer-readable storage medium according to claim 15, wherein the operations further comprise: if the validity of the target base station is verified, obtaining, by the operator server, verification information of the target base station; and determining, by the operator server, according to the verification information of the target base station and verification information of each candidate base station in the operator server, whether the validity of the target base station is verified.

20. The non-transitory computer-readable storage medium according to claim 15, wherein the operations further comprise: if the mobile phone number verification succeeds, parsing, by the back-end server, the verification request packet to obtain basic information of a stored mobile phone number corresponding to the verification request packet and an identification code corresponding to the verification request packet;

matching, by the back-end server, the stored mobile phone number and the identification code corresponding to the verification request packet with the stored mobile phone number and the identification code sent by the application to generate a matching result; and determining, by the back-end server, the verification notification according to the matching result.

* * * * *